US010743524B2

(12) United States Patent
Lutz et al.

(10) Patent No.: US 10,743,524 B2
(45) Date of Patent: Aug. 18, 2020

(54) CONTAINMENT SYSTEM FOR AQUATIC ANIMALS

(71) Applicant: Elive LLC, New Berlin, WI (US)

(72) Inventors: Thomas Lutz, Cedar Rapids, IA (US); Matthew Allen, Waterford, WI (US)

(73) Assignee: It's Lit Lighting Solutions LLC, Chicago, IL (US)

( * ) Notice: Subject to any disclaimer, the term of this patent is extended or adjusted under 35 U.S.C. 154(b) by 1465 days.

(21) Appl. No.: 14/201,032

(22) Filed: Mar. 7, 2014

(65) Prior Publication Data

US 2014/0251932 A1 Sep. 11, 2014

Related U.S. Application Data

(60) Provisional application No. 61/774,304, filed on Mar. 7, 2013.

(51) Int. Cl.
| | |
|---|---|
| *A01K 63/02* | (2006.01) |
| *A01K 63/00* | (2017.01) |
| *A01K 63/06* | (2006.01) |
| *A01K 63/04* | (2006.01) |
| *A47F 7/00* | (2006.01) |

(52) U.S. Cl.
CPC .......... *A01K 63/003* (2013.01); *A01K 63/042* (2013.01); *A01K 63/06* (2013.01); *A47F 7/00* (2013.01)

(58) Field of Classification Search
CPC ...... A01K 1/03; A01K 63/003; A01K 63/006; A01K 63/042
USPC ........ 119/215, 224, 245–250, 263, 267, 269, 119/455; 211/184
See application file for complete search history.

(56) References Cited

U.S. PATENT DOCUMENTS

| | | | | |
|---|---|---|---|---|
| 2,540,353 | A | * | 2/1951 | Schick .................. A47F 5/0018 108/92 |
| 3,774,575 | A | * | 11/1973 | Patterson ............. A01K 63/003 119/245 |
| 4,615,276 | A | * | 10/1986 | Garabedian ............ A47F 5/005 108/61 |
| 5,042,425 | A | | 8/1991 | Frost, Jr. |
| 5,197,409 | A | | 3/1993 | Hammond |
| 5,365,886 | A | * | 11/1994 | Frost, Jr. .............. A01K 63/003 119/267 |
| 5,413,070 | A | | 5/1995 | DeWalt |
| D362,135 | S | | 9/1995 | Wilson et al. |

(Continued)

OTHER PUBLICATIONS

"EcoQube—Desktop Ecosystem That Grows Flowers and Herbs", by Aqua Design Innovations, https://www.kickstarter.com/projects/kevinzl/ecoqube-desktop-ecosystem-that-grow-flowers-and-he, Dec. 30, 2013 (25 pages).

*Primary Examiner* — Peter M Poon
*Assistant Examiner* — Danielle A Clerkley (57) ABSTRACT

A system for displaying aquatic animals in a retail environment includes a base having a plurality of shelves, and a plurality of removable containment elements disposed on the shelves, each of the containment elements including a bottom, a top, and side walls extending between the top and the bottom to enclose a volume of water. At least one of the side walls defines a flat side viewing panel for viewing an aquatic animal inside of the containment element. Each of the containment elements is a rectangular-shaped that is sized to contain a salable number of aquatic animals.

6 Claims, 8 Drawing Sheets

(56) References Cited

U.S. PATENT DOCUMENTS

| | | | | |
|---|---|---|---|---|
| 5,460,277 A | * | 10/1995 | Silva | A45C 5/00 |
| | | | | 211/4 |
| 5,647,983 A | * | 7/1997 | Limcaco | A01K 61/00 |
| | | | | 119/260 |
| 5,881,753 A | * | 3/1999 | Bowling | A01K 63/006 |
| | | | | 119/72 |
| 6,305,324 B1 | | 10/2001 | Hallock et al. | |
| 6,520,117 B1 | * | 2/2003 | Wood | A01K 63/003 |
| | | | | 119/246 |
| 6,553,939 B1 | | 4/2003 | Austin et al. | |
| 6,588,371 B2 | | 7/2003 | Hallock et al. | |
| 6,729,266 B1 | | 5/2004 | Gabriel et al. | |
| 6,810,833 B2 | | 11/2004 | Bonner et al. | |
| 7,032,540 B2 | | 4/2006 | Bonner et al. | |
| 7,237,509 B2 | | 7/2007 | Bonner et al. | |
| 7,527,022 B2 | | 5/2009 | Bonner et al. | |
| 7,594,481 B2 | | 9/2009 | Carter et al. | |
| 7,810,452 B2 | | 10/2010 | Pieretto et al. | |
| 8,316,802 B2 | | 11/2012 | Hallock | |
| 9,655,348 B2 | * | 5/2017 | Lari | A01K 63/006 |
| 2004/0144328 A1 | * | 7/2004 | Bonner | A01K 1/03 |
| | | | | 119/455 |
| 2009/0272329 A1 | * | 11/2009 | Conger | A01K 1/031 |
| | | | | 119/417 |
| 2011/0041773 A1 | * | 2/2011 | Brielmeier | A01K 1/031 |
| | | | | 119/419 |
| 2014/0174374 A1 | * | 6/2014 | Lari | A01K 63/006 |
| | | | | 119/245 |

* cited by examiner

CONTAINMENT SYSTEM FOR AQUATIC ANIMALS

CROSS-REFERENCE TO RELATED APPLICATIONS

This application claims priority to U.S. Provisional Application No. 61/774,304 filed Mar. 7, 2013, the entire contents of which are incorporated herein by reference.

BACKGROUND

The present invention relates to a containment system, and in particular to a containment system for displaying aquatic animals in a retail environment.

Current containment systems for retail environments include a built-in aquarium tank with a cover or panel over the tank. Accessing fish or other aquatic animals for removal in these animal containment systems requires the cover or panel to be removed by an employee. With the cover or panel removed, the employee uses a net to remove the fish from the tank. Once removed, the fish are placed into a bag or other transport container. Additional water is then added to the bag or transport container so that a customer can take the fish home.

Some of the fish inside the built-in aquarium often reside in the built-in aquarium for years before being removed. This long-term residence requires long-term water quality and control, which requires chemical, biological and mechanical filtration elements, along with the need for water change and other maintenance.

SUMMARY

In accordance with one construction, a system for displaying aquatic animals in a retail environment a base having a plurality of shelves, and a plurality of removable containment elements disposed on the shelves, each of the containment elements including a bottom, a top, and side walls extending between the top and the bottom to enclose a volume of water. At least one of the side walls defines a flat side viewing panel for viewing an aquatic animal inside of the containment element. Each of the containment elements is a rectangular-shaped that is sized to contain a salable number of aquatic animals.

In accordance with another construction, a system for displaying aquatic animals in a retain environment includes a base including a plurality of substantially horizontal shelves, and a plurality of removable containment elements positioned on the plurality of shelves, each containment element including a bottom, a top, and a side extending between the top and the bottom to enclose a volume of water less than that which sustains ten or more fish, the top including an aperture. The system also includes a pump operable to produce a flow of compressed air, and a main manifold coupled to the pump to receive the flow of compressed air from the pump. The main manifold is operable to direct a separate shelf flow of air to each shelf. The system also includes a plurality of shelf manifolds each positioned adjacent one of the shelves and operable to receive the shelf flow of air from the main manifold, and a plurality of tubes each having a first end connected to one of the shelf manifolds and a second end selectively engageable with the top of one of the removable containment elements to direct air from the pump through the aperture of the respective top.

In accordance with another construction, a method of displaying and distributing aquatic animals includes a base having a front facing portion and a side facing portion, and a plurality of substantially horizontal shelves disposed within each of the front facing portion and the side facing portion, the shelves sized to support a plurality of removable containment elements. The system also includes a plurality of guide elements disposed on the shelves sized to position and limit movement of the containment elements, and a plurality of light elements disposed on the shelves to emit light up into the removable containment elements.

DETAILED DESCRIPTION

Figure 1:
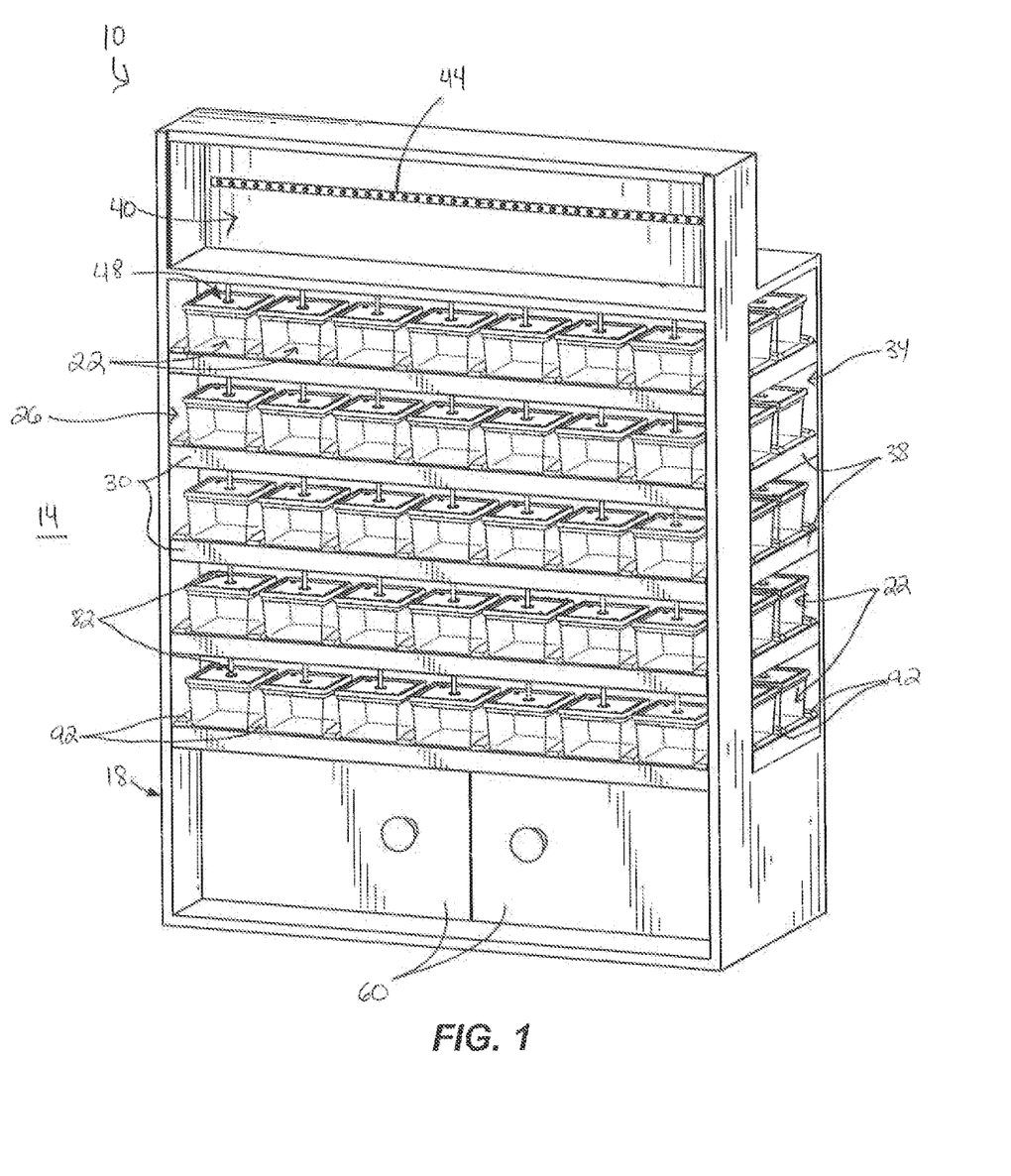
FIG. 1 is a front perspective view of a containment system according to one construction.
Figure 2:
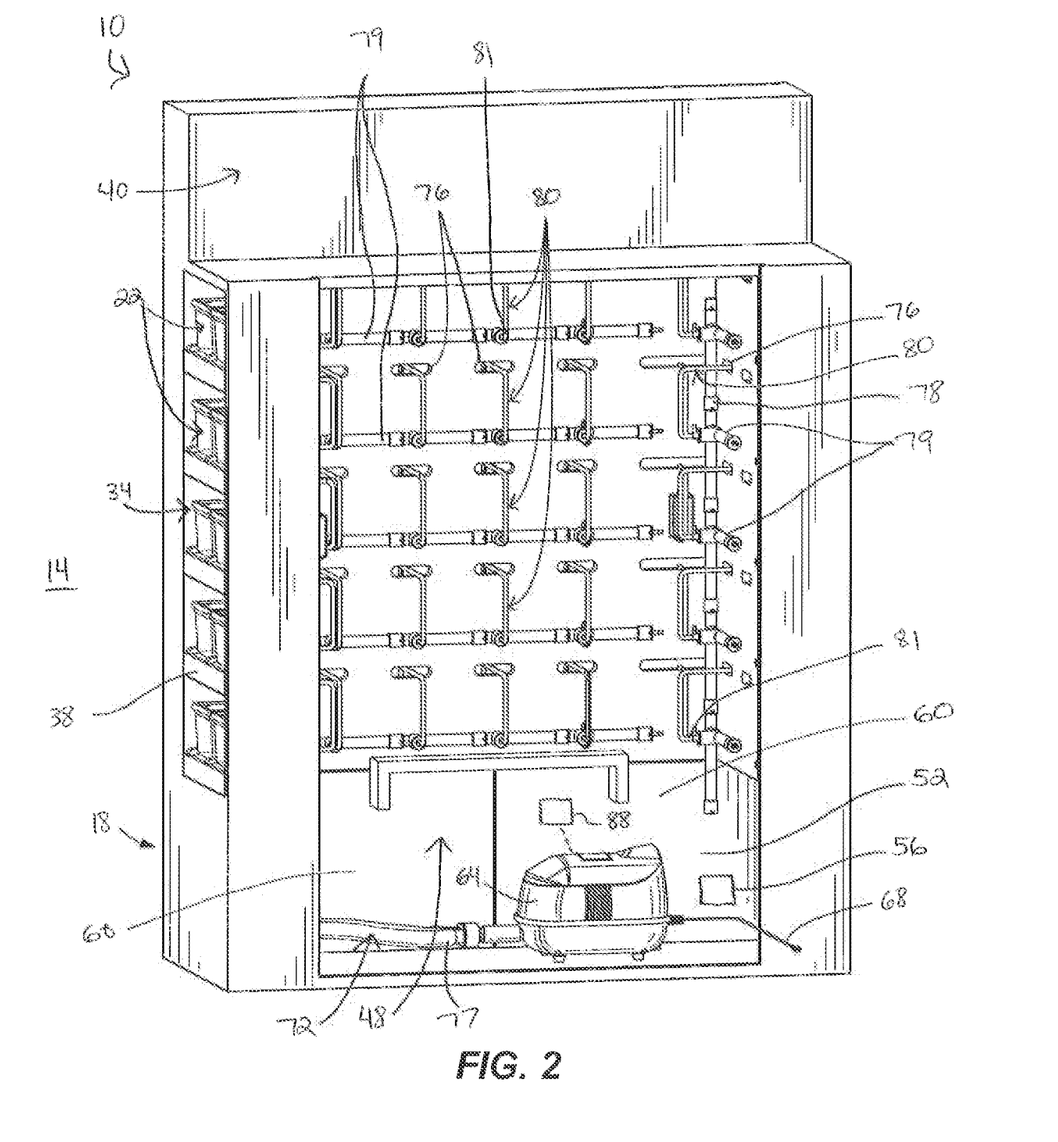
FIG. 2 is a back perspective view of the containment system of FIG. 1.

FIGS. 1 and 2 illustrate an animal containment system 10 for use as a fixture within a retail environment 14. The system 10 includes a base 18 that supports and positions a plurality of removable containment elements 22.

The base 18 includes a front facing portion 26 having a plurality of shelves 30 extending horizontally and parallel relative to one another. The base 18 further includes at least one side facing portion 34 having a plurality of shelves 38 extending horizontally and parallel relative to one another. The side facing portion 34 extends perpendicular to the front facing portion 26. The shelves 30, 38 support the containment elements 22, and the front and side facing portions 26, 34 provide customer access and viewing of the containment elements 22 at various angles within the retail environment 14. The base 18 further includes a display area 40 at a top of the base 18 for signs, labels, etc. that are back-lit by a light source 44 (illustrated in FIG. 1).

With continued reference to FIGS. 1 and 2, each of the containment elements 22 is a cup sized and shaped to hold an isolated volume of water, along with a salable number of aquatic animals (i.e., a number of a particular animal typically purchased by a consumer). For example, Bettas are typically purchased with one fish in each container, with other species of fish being able to share a container. However, the salable size is typically not broken up or divided for sales. While the illustrated animals in FIGS. 1-13 are Betta fish, the system 10 may be used for many aquatic species, and is not intended to be limited to small volume removable animal containment elements 22. In some constructions, for example, the system 10 is scaled to larger volumes, and includes containment elements 22 that contain one to ten or more fish of various size.

With continued reference to FIGS. 1 and 2, the base 18 includes an air distribution system 48 that supports the animals within the containment elements 22. A portion of the air distribution system 48 is hidden behind the front facing portion 26 and housed in a lower compartment 52 (illustrated in FIG. 2). The lower compartment 52 also houses other electrical equipment 56 (e.g., LED power supplies, transformers etc., illustrated schematically in FIG. 2) to support the system 10. To service the air distribution system 48 and the other electrical equipment 56, access doors 60 are incorporated into the base 18 in front of the compartment 52.

With continued reference to FIGS. 1 and 2, the air distribution system 48 includes an air pump 64 (or compressor) powered by a power supply 68, and a set of conduits 72 coupled to the air pump 64 that extend through openings 76 to the front facing portion 26 and side portions 34 to deliver air from the air pump 64 to each of the containment elements 22.

As illustrated in FIG. 2, the set of conduits 72 includes a main manifold 77 coupled to the pump 64 to receive a flow of compressed air from the pump 64. The main manifold 77 is operable to direct a separate shelf flow of air to each shelf 30, 38 through a plurality of vertical manifolds 78 and horizontal shelf manifolds 79, each of the shelf manifolds 79 being positioned adjacent one of the shelves 30, 38. The shelf manifolds 79 are operable to receive the shelf flow of air from the main manifold 77, and to direct the air through a plurality of tubes 80 each having a first end 81 connected to one of the shelf manifolds 78 and a second, outlet end 82 selectively engageable with the top of one of the removable containment elements 22.

The conduits 72 are sized, tapered, and stepped down in diameter from the air pump 64 to the containment elements 22 to provide uniform air distribution flow rates at all of the outlet ends 82, independent of distance from the air pump 64.

Figure 3:
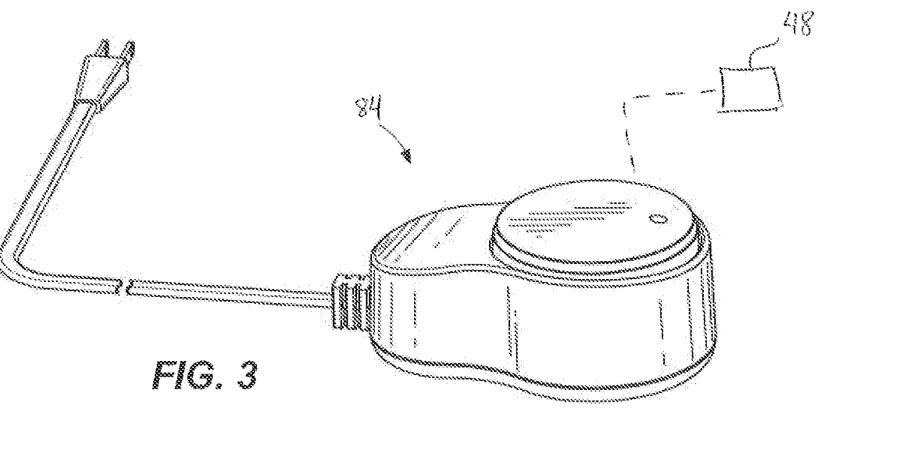
FIG. 3 is a perspective view of an air modulator for the containment system.

With reference to FIG. 3, the system 10 also includes an air modulator 84 (e.g., a rheostat) coupled to the air distribution system 48 to modulate and provide coarse adjustment of air flow moving through tubing 72 to each containment element 22. Because the air distribution system 48 is designed such that all of the outlet ends 82 have similar air flow rates, a course adjustment to the entire system 48 with the modulator 84 effectively controls air flow for the entire system 48. In some constructions a local restrictor is also, or alternatively, provided at each outlet end 82 to allow for individual air control at each outlet end 82.

A higher air flow rate, with a higher percentage of "on" time for the air distribution system 48, results in higher amounts of evaporation within each of the containment elements 22. Thus, with certain species of animal, evaporation rates in the containment elements 22 are reduced by managing the time that air is flowing through the air distribution system 48. In particular, and with reference to FIG. 2, a timer 88 (illustrated schematically) is provided to control the flow of air from the air pump 64 through the tubing 72. The timer 88 sets the flow of air moving through the tubing 72 on a cycle (e.g., a daily cycle with twelve hours on and twelve hours off, or an hourly cycle with forty minute on and twenty minutes off, etc.) to optimize the conditions within the containment elements 22 for a particular species of animal (certain species of animals benefitting from lower or no air flow for a period of time during the day). Other constructions include various other types of cycles, each of which vary based on the type of animal species present in the containment elements 22 and desired air flow rates into each of the containment elements 22.

Figure 4:
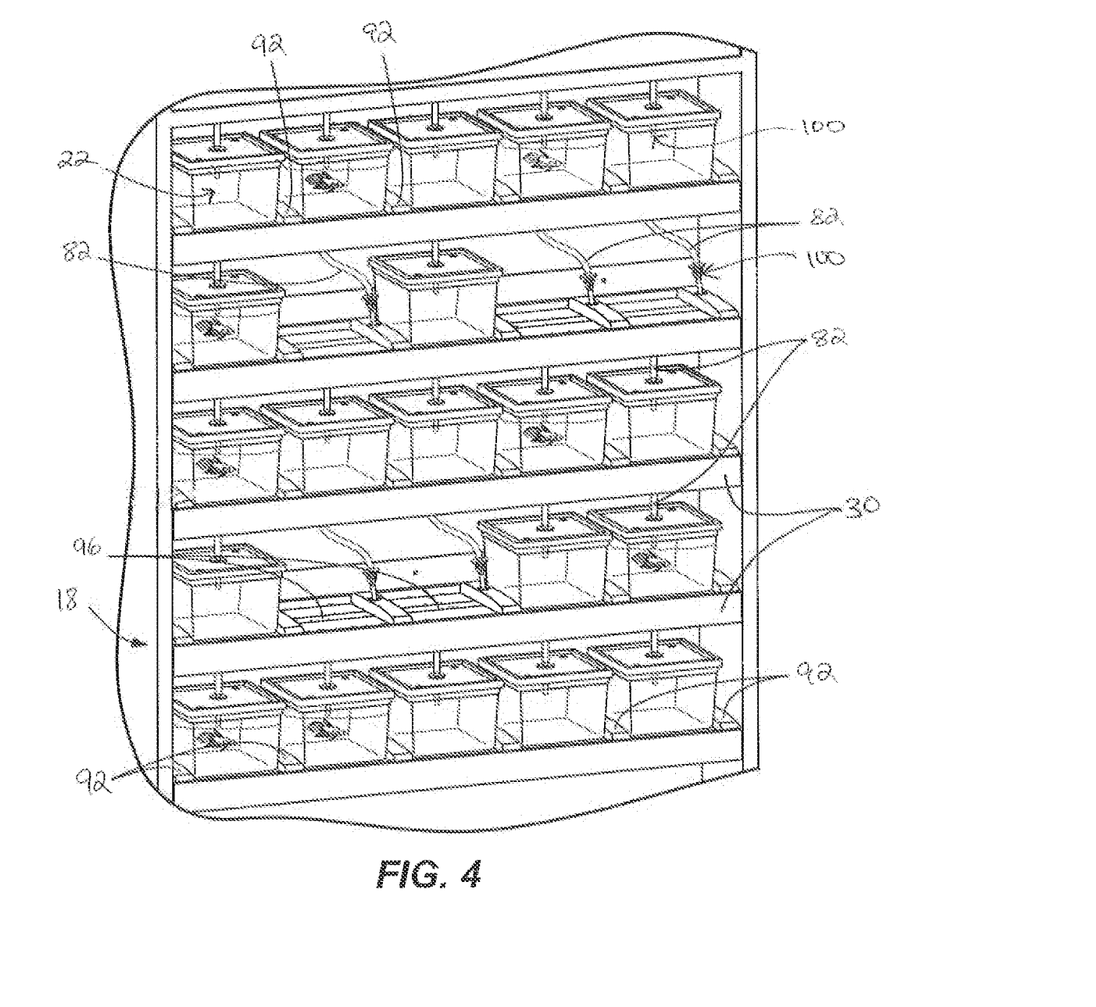
FIG. 4 is a perspective view of a portion of the containment system, illustrating a plurality of shelves each partially or completely filled with containment elements.
Figure 5:
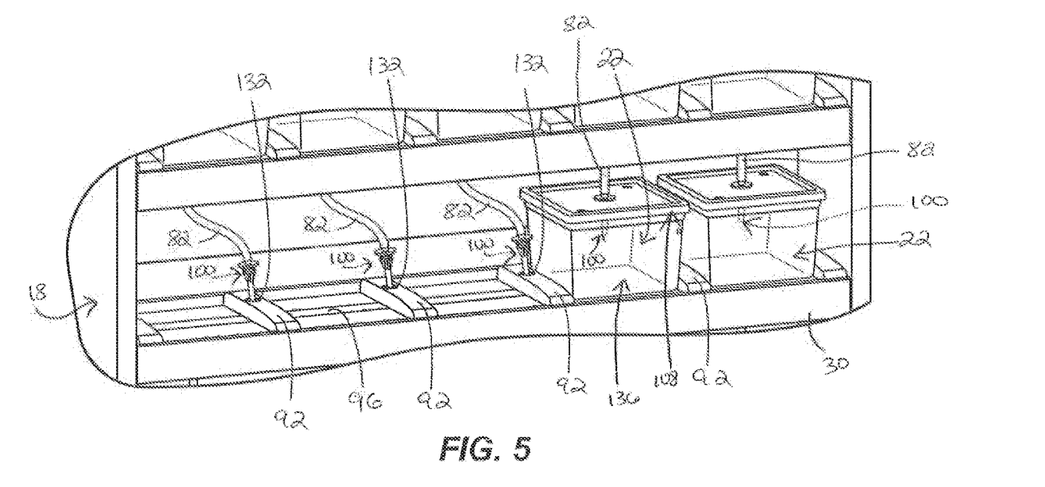
FIG. 5 is a perspective view of a single shelf of the containment system, partially filled with containment elements.

With reference to FIGS. 1 and 4, the base 18 includes elongate guide elements 92 that are disposed on the shelves 30, 38 and provide added support for the containment elements 22. In some constructions the guide elements 92 are integrally formed as part of the shelves 30, 38. The guide elements 92 position the containment elements 22 along the shelves 30, 38, such that the containment elements 22 are disposed below the outlet ends 82 of the air distribution system 48. The guide elements 92 provide pathways for removal and insertion of the containment elements 22 within the base 18, and inhibit the containment elements 22 from sliding laterally along the shelves 30, 38. The guide elements 92, in combination with the shelves 30, 38, provide for quick insertion, servicing, and removal of the containment elements 22, and further provide for a clean and finished overall appearance to the system 10. Other constructions include different shapes, sizes, and positions for the guide elements 92 than that illustrated.

With continued reference to FIG. 4, the system 10 also includes a plurality of elongate lighting elements 96 (e.g., LEDs) that are disposed above the shelves 30, 38 and extend between the guide elements 92. In some constructions the lighting elements 96 are integrally formed as part of the shelves 30, 38. The lighting elements 96 emit light (e.g., blue or other light) into the containment elements 22 from beneath the containment elements 22, and are powered by the electrical equipment 56 disposed in the compartment 52. Other constructions include different shapes, sizes, and positions for the lighting elements 96 than that illustrated.

Figure 8:
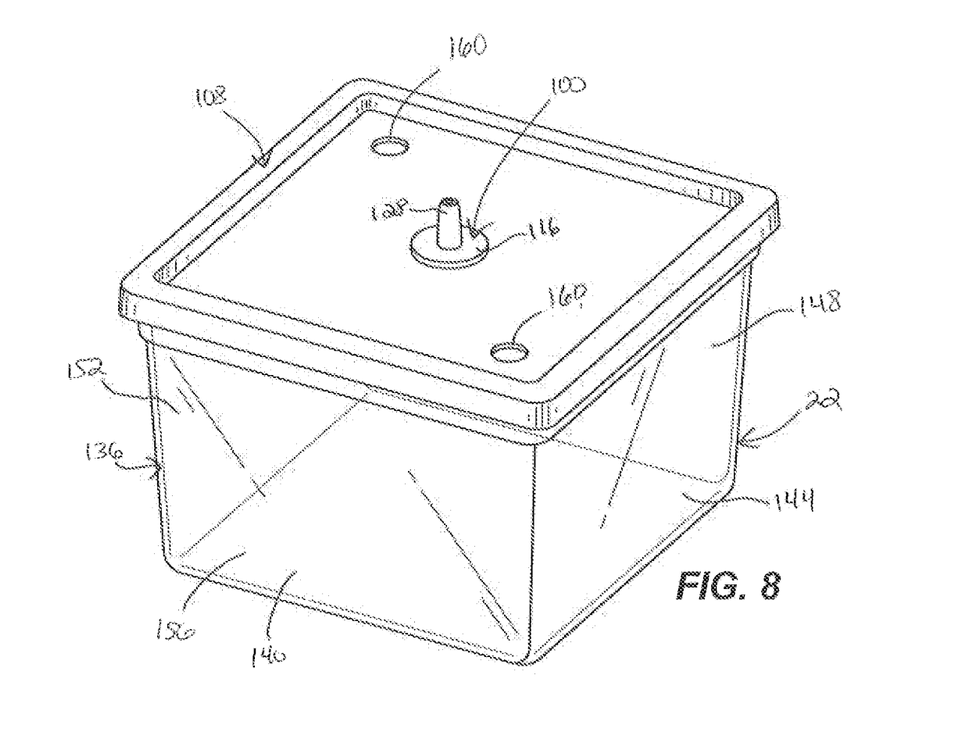
FIG. 8 is a perspective view of one of the containment elements.
Figure 9:
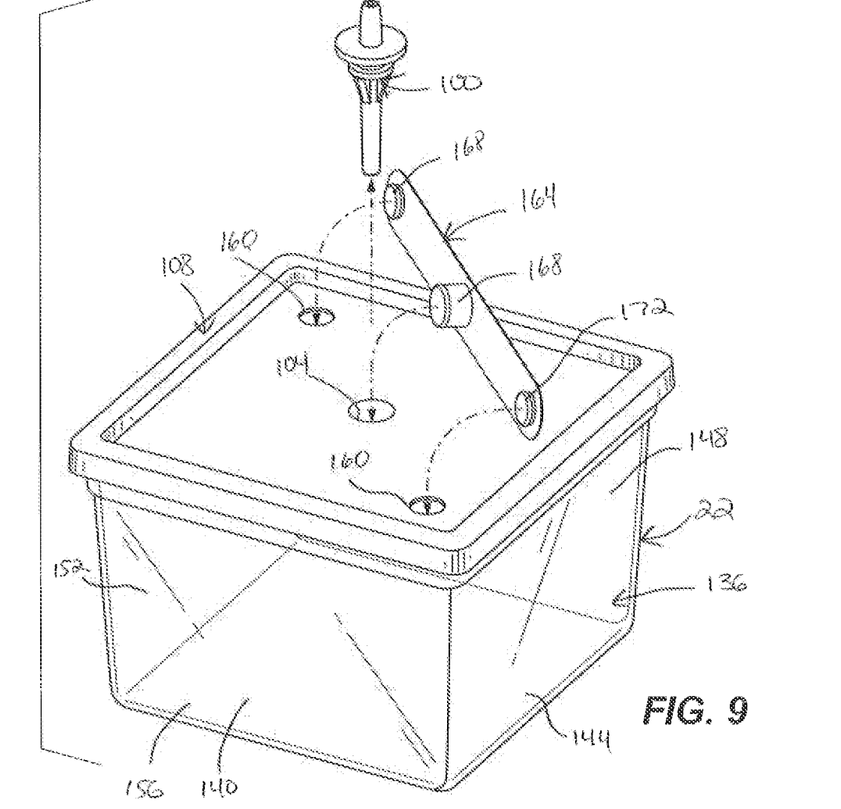
FIG. 9 is an exploded perspective view of one of the containment elements, along with a nozzle for distributing air into the containment element.
Figure 10:
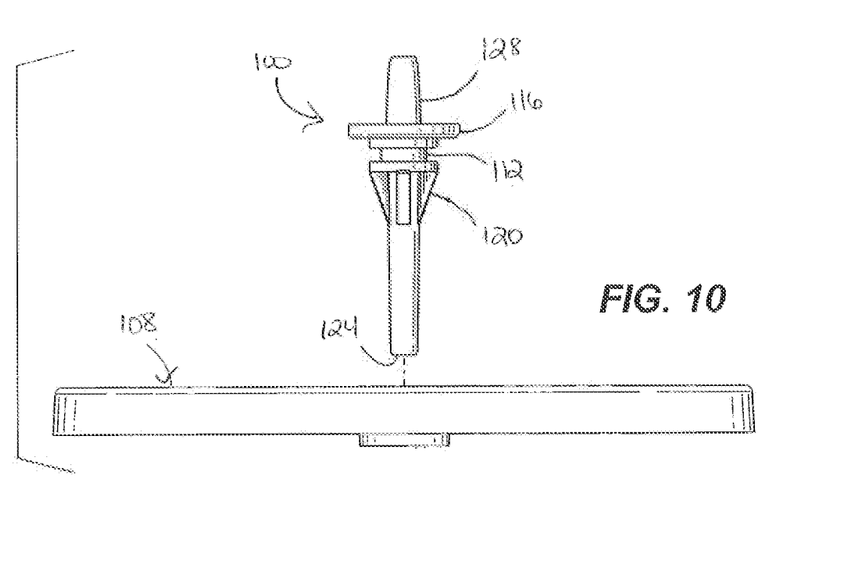
FIG. 10 is a front view of a cover of one of the animal containment elements, along with the nozzle.

With reference to FIGS. 4-13, the air distribution system 48 includes nozzles 100 coupled to the outlet ends 82. The nozzles 100 provide pathways for air to move from the outlet ends 82 into the water within each containment element 22. The nozzles 100 extend into the containment elements 22 through apertures 104 (illustrated in FIG. 9) disposed on covers 108 of the containment elements 22. As illustrated in FIG. 10, each nozzle 100 includes a nozzle positioning guide 112 that positions the nozzle 100 within the aperture 104, a cover interface stop 116 that remains outside of the containment element 22 and further helps position the nozzle 100, a cover interface lock channel 120 that receives an o-ring or other element so that when the nozzle 100 is inserted into the aperture 104 a positive connection is made, a termination end 124 that terminates in the water within the containment element 22, and a tube connection end 128 that couples to the outlet end 82.

The positioning of the nozzles 72 determines turbulence and circulation rates within the containment elements 22. In some constructions the nozzles 72 have venturi style fittings to induce water circulation within the containment elements 22 as air exits the nozzles 72. When the air flow rates are high and water levels are near tops of the containment elements 22, improper placement of the nozzles 72 can result in water overflow. The apertures 104, nozzle positioning guides 112, cover interface stops 116, and cover interface lock channels 120 help position the nozzles 100 properly and prevent water overflow, and enable specific, controllable, and reproducible placement of the nozzles 100 into the containment elements 22.

With reference to FIGS. 4-7, in some constructions the shelves 30, 38 are not completely filled with containment elements 22. Some of the nozzles 100 thus do not extend into the water within a containment element 22, but instead terminate into the atmosphere. The air distribution system 48 can only tolerate a limited number of nozzles 100 that terminate into the atmosphere. If too many nozzles 100 terminate into the atmosphere, the back pressure created by the nozzles 100 that are submersed in water in the containment elements 22 becomes too great relative to the lower resistance of the nozzles 100 that terminate into the atmosphere, and all of the air then flows out of the nozzles 100 that terminate into the atmosphere rather than out of the nozzles 100 that are disposed within the containment elements 22.

Figure 6:
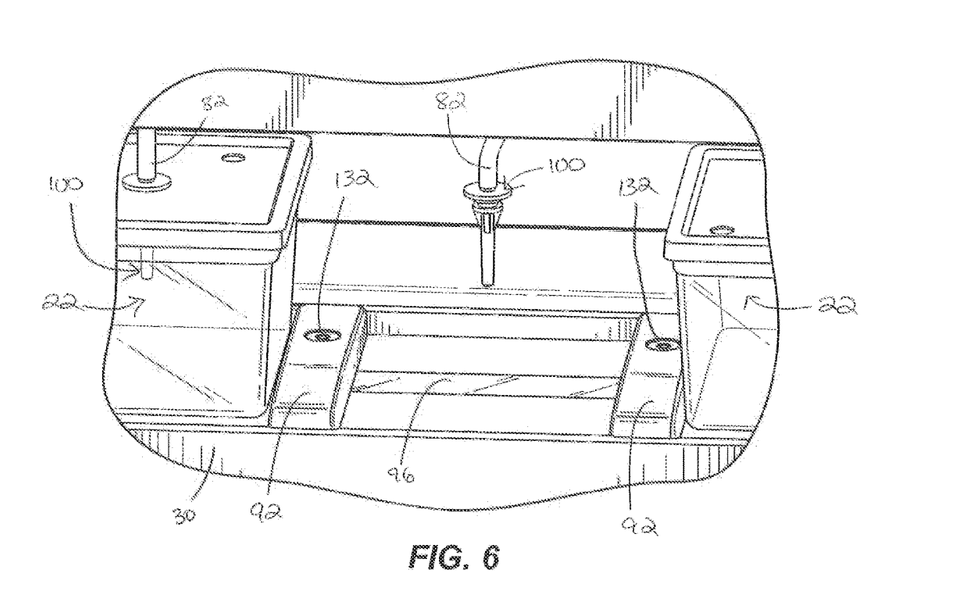
FIGS. 6 and 7 are enlarged perspective views of portions of a shelf of the containment system.
Figure 7:
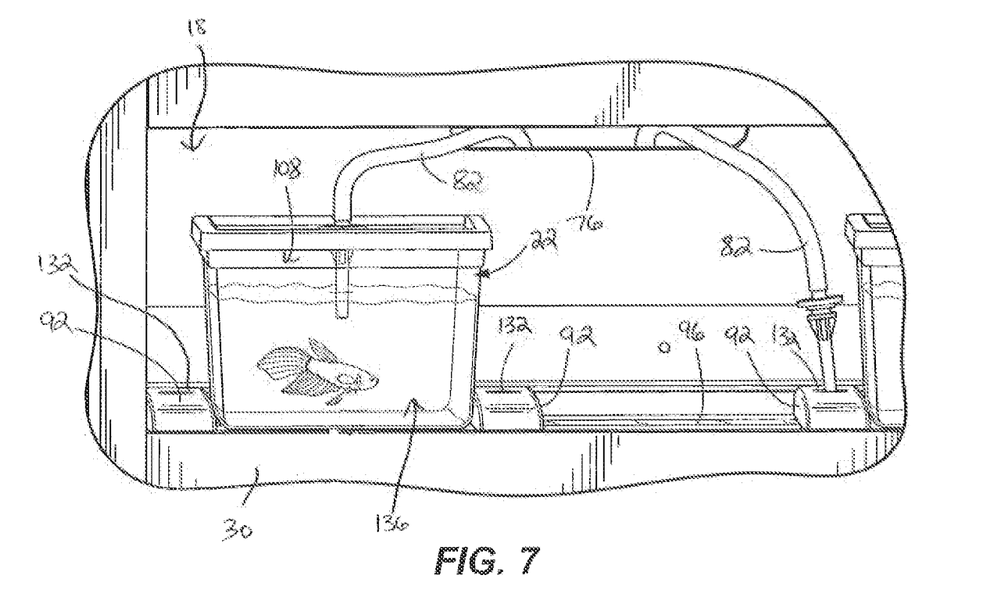

To prevent all of the air from flowing out of the nozzles 100 that terminate into the atmosphere, the guide elements 92 include air termination plugs 132 that receive the nozzles 100. The air termination plugs 132 hold the nozzles 100 in place, and prevent air from flowing out of the nozzles 100. The plugs 132 are disposed on the guide elements 92. In some constructions caps are provided instead that fit over the ends of nozzles 100. In some constructions one or more valves are used instead to open and close the nozzles 100 or to open and close the air distribution system 48. Other constructions include other structures that prevent the nozzles 100 from terminating into the atmosphere and allowing air to flow out into the atmosphere.

With reference to FIGS. 8, 9, 11, and 12 each of the containment elements 22 has a body 136 with a generally rectangular shape. The body 136 includes a first side wall 140, a second side wall 144, a third wall 148, and a fourth side wall 152. Each containment element 22 also includes a bottom wall 156, the cover 108 being disposed opposite the bottom wall 156, and the first, second, third, and fourth walls 140, 144, 148, 152 extending between the bottom wall 156 and the cover 108. At least one of the side walls 140, 144, 148, 152 is flat, clear and transparent, providing a clear view of water and one or more aquatic animals inside the containment element 22, without refractive lighting and viewing that can occur with a more rounded containment element (e.g., such as the rounded containment element 222 illustrated in FIG. 12, where due to refraction of the round containment element 222, a fish can barely be seen, can be seen only in a distorted state, or in many locations within the containment element 222 cannot be seen at all). In contrast to containment element 222 in FIG. 12, the animal in containment element 22 is visible in all locations within the containment element 22 and is not distorted in any way. Additionally, in conjunction with the lighting elements 96, the animal's coloration is displayed within containment element 22.

In some constructions one or more of the side walls 140, 144, 148, 152 is frosted or fogged, to provide limited to no viewing inside of the containment element 22 through that particular side wall. For example, in some constructions the side walls 144 and 152 are frosted, whereas the side walls 140 and 148 are clear and transparent, with the side wall 140 being oriented toward the front of the base 18 (i.e., visible to consumers), and the side walls 144 and 152 being oriented toward other containment elements 22 along one of the shelves 30. In this arrangement the animals inside of the containment elements 22 are prohibited from viewing one another through the frosted side walls 144 and 152, which helps to prevent undesired stress and anxiety for some species.

Figure 11:
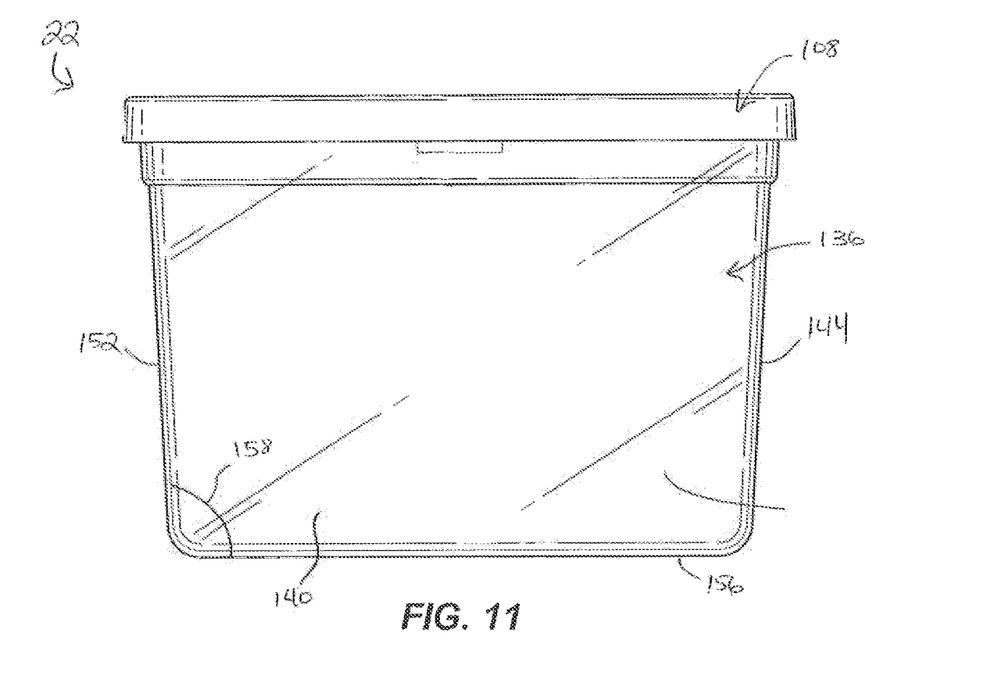
FIG. 11 is a side view of one of the containment elements.
Figure 12:
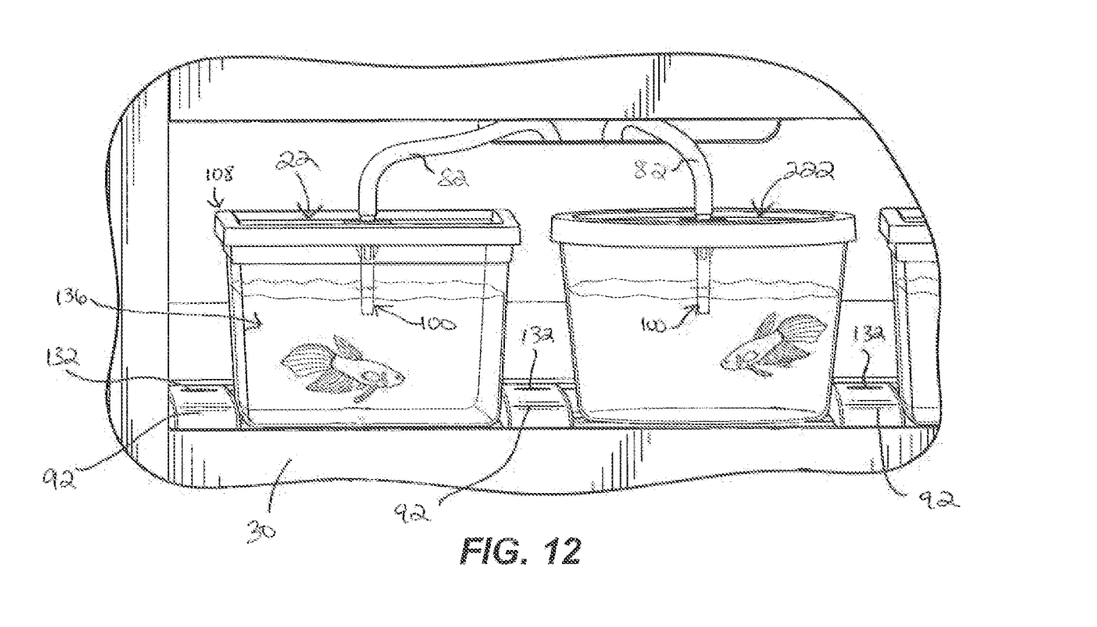
FIG. 12 is a perspective view of one of the containment elements next to a differently-shaped containment element.

With continued reference to FIGS. 8, 9, and 11, each side wall 140, 144, 148, 152 extends at an angle 158 (illustrated for example in FIG. 11) relative to the bottom wall 156 between 95-105 degrees. In some constructions each side wall 140, 144, 148, 152 is angled at approximately 100 degrees relative to the bottom wall 156. Other constructions include different ranges and values for the angles. The arrangement of the side walls 140, 144, 148, 152 in the illustrated containment elements 22 enables the containment elements 22 to be placed close together, while also allowing fingers to grab hold of the containment elements 22 for removal.

With reference to FIGS. 8 and 9, each containment element 22 also includes two access openings 160 disposed in the cover 108 that are used for adding food and water to the containment element 22 without having to remove the cover 108. While two access openings 160 are illustrated, other constructions include different numbers and locations of access openings 160. The containment element 22 also includes a closure member 164 that includes projections 168 which seal and cover the openings 160 and the aperture 104 when the containment element 22 is not in use, or when no air, food, or water is being added to the containment element 22.

Figure 13:
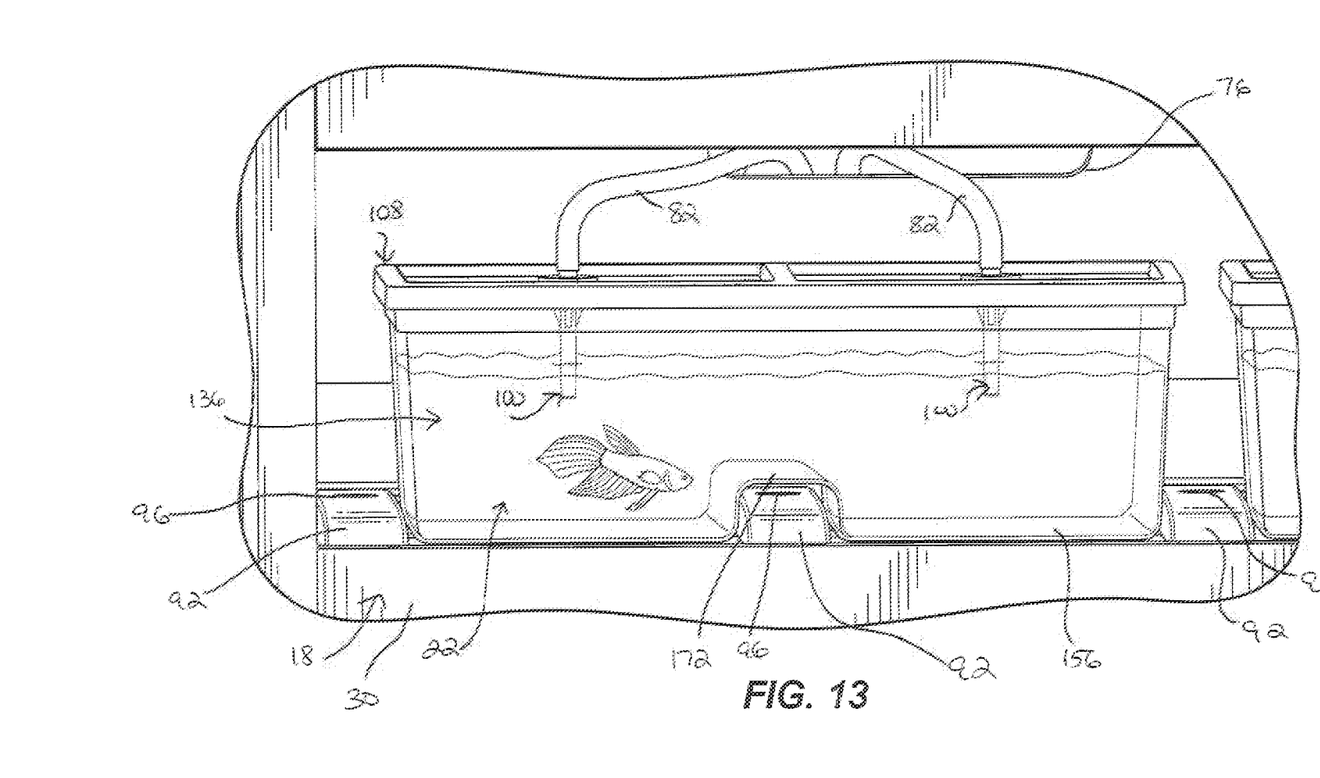
FIG. 13 is a perspective view of a containment element having a double-wide configuration.

With reference to FIG. 13, in some constructions one or more of the containment elements 22 has a "double wide" configuration, wherein the containment element 22 includes a raised area 172 along the bottom wall 156 that is sized and shaped to slide over one of the guide elements 92. The double wide containment element 22 is twice as wide as the containment elements 22 in FIGS. 1-12, and includes approximately twice as much water. Other constructions include containment elements 22 that are three times as wide, etc. than the containment elements 22 in FIGS. 1-12, and include two or more raised areas 172 such that the containment elements 22 are still able to easily fit onto the shelves 30, 38. As illustrated in FIG. 13, the double wide containment element 22 uses two nozzles 100, so that twice the quantity of air may be added.

Overall, the size and shape of the containment elements 22 illustrated in FIGS. 1-13 maximizes the density of removable containment elements 22 within the overall system 10 while also maximizing water volume and preserving optimal viewing. Further, with enhanced oxygenation and water circulation, the morbidity and mortality rates of the animals in the containment elements 22 is decreased and the overall health and wellbeing of the animals increases.

The system 10 maintains animal health through aeration, creating sustainable oxygenation levels, as well as water circulation within the containment element (e.g., removing and adding water to the containment element 22). The system 10 is designed for short to medium term residency and storage of the animals within the containment elements 22. In particular, the system 10 is designed to store each animal for a few weeks to a few months at a time (as opposed to years) before turnover occurs. Although, other constructions may be designed to provide different storage times. Because the functionality of the system 10 is designed for short to medium term residency and storage, the system 10 is able to operate without the use of a common water supply/exchange system and the complications associated with a common water supply/exchange system. Despite the short to moderate term residency of the animals within the system 10, specific needs of each species of animal (e.g., oxygenation requirements, water circulation flow rates and special volumetric requirements for movement) are still met with the air distribution system 48 and containment elements 22 described above.

In use, the system 10 is positioned within a store at a location where animals such as fish are typically sold. Containment element 22 are positioned on the various shelves 30, 38 and are filled with water. A salable quantity of the aquatic animals (e.g., one Betta fish) is positioned in each containment element 22 so that the animals are prominently displayed. The tubes 80 are connected to each of the containment elements 22 and the pump 64 is operated to deliver air to each of the containment elements 22. The lighting elements 96 illuminate the containment elements 22 and in combination with the noise produced by the air distribution system 48 attract customers to the system 10. When a customer selects an animal for purchase, there is no need to capture the animal or scoop it from the containment element 22. Rather, the tube 80 is disconnected from the containment element 22 and the containment element 22 is removed from the base 18 and sold with the animal. The containment element 22 is used to transport the animal to the customer's home before placement into the customer's habitat. The lighting cycles (and colors) and aeration cycles can be timed to coincide with the circadian cycle or with shopping cycles as may be desired. While the animals are on display, water and food can be added to the individual containment elements 22 as necessary to sustain the animals and to balance the air distribution system 48.

Various features and advantages of the invention are set forth in the following claims.

What is claimed is:

1. A system for displaying aquatic animals in a retail environment comprising:
   a base including a plurality of substantially horizontal shelves;
   a plurality of removable containment elements positioned on the plurality of shelves, each containment element being a cup that includes a bottom, a top, and a side extending between the top and the bottom to enclose a volume of water less than that which sustains ten or more fish, the top including an aperture, wherein each containment element is configured to be removed from the system and transported to an aquarium to move the fish to the aquarium;
   a pump operable to produce a flow of compressed air;
   a main manifold coupled to the pump to receive the flow of compressed air from the pump, the main manifold operable to direct a separate shelf flow of air to each shelf;
   a plurality of shelf manifolds each positioned adjacent one of the shelves and operable to receive the shelf flow of air from the main manifold;
   a plurality of tubes each having a first end connected to one of the shelf manifolds and a second end selectively engageable with the top of one of the removable containment elements to direct air from the pump through the aperture of the respective top; and
   nozzles coupled to the second ends of the tubes, each nozzle including a nozzle positioning guide that positions the nozzle within the aperture, a termination end that extends into the containment element and delivers air directly into the containment element, and a tube connection end that couples with the second end of one of the tubes.

2. The system of claim 1, further comprising air termination plugs that receive the termination ends of the nozzles and prevent air from exiting the nozzles when the termination ends of the nozzles are not within the containment elements.

3. The system of claim 2, wherein the base includes guide elements that position the containment elements, and wherein the air termination plugs are disposed on the guide elements.

4. The system of claim 2, wherein the base includes a plurality of guide elements disposed on the shelves and positioned between the containment elements to limit movement of the containment elements laterally along the shelves, and wherein the termination plugs are disposed on the shelves.

5. The system of claim 1, wherein the top of each containment element includes a cover, wherein the cover includes at least one access opening for providing food and water to the containment element, and wherein the cover further includes the aperture.

6. The system of claim 5, wherein each nozzle includes a cover interface stop that is configured to rest on top of the cover, wherein the cover interface stop further helps to position the nozzle when the nozzle is in the aperture.

* * * * *